(12) United States Patent
Wang

(10) Patent No.: US 9,001,146 B2
(45) Date of Patent: Apr. 7, 2015

(54) AUTOMATICALLY DETERMINING AN OBJECT DISPLAY MODE TO DISPLAY OBJECTS

(75) Inventor: Xin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 13/105,690

(22) Filed: May 11, 2011

(65) Prior Publication Data

US 2012/0001897 A1 Jan. 5, 2012

(30) Foreign Application Priority Data

Jun. 30, 2010 (CN) .......................... 2010 1 0218763

(51) Int. Cl.
*G09G 5/00* (2006.01)
*G06F 9/44* (2006.01)
*G06F 3/14* (2006.01)

(52) U.S. Cl.
CPC ................ *G06F 9/4443* (2013.01); *G06F 3/14* (2013.01)

(58) Field of Classification Search
USPC ........................................................ 715/779
See application file for complete search history.

(56) References Cited

U.S. PATENT DOCUMENTS

| | | | |
|---|---|---|---|
| 5,001,697 A | 3/1991 | Torres | |
| 5,412,776 A | 5/1995 | Bloomfield et al. | |
| 6,026,409 A | 2/2000 | Blumenthal | |
| 6,163,317 A | 12/2000 | de Judicibus | |
| 6,208,343 B1 | 3/2001 | Roth | |
| 6,300,947 B1 | 10/2001 | Kanevsky | |
| 6,983,424 B1* | 1/2006 | Dutta | 715/800 |
| 8,677,279 B2* | 3/2014 | Gan et al. | 715/854 |
| 2004/0078759 A1 | 4/2004 | Ohashi et al. | |
| 2005/0060665 A1* | 3/2005 | Rekimoto | 715/810 |
| 2007/0240077 A1* | 10/2007 | McCarthy et al. | 715/802 |
| 2008/0098332 A1* | 4/2008 | LaFrance-Linden et al. | 715/846 |
| 2008/0307350 A1* | 12/2008 | Sabatelli et al. | 715/779 |
| 2010/0241507 A1* | 9/2010 | Quinn et al. | 705/14.42 |

FOREIGN PATENT DOCUMENTS

| | | |
|---|---|---|
| CN | 101030203 A | 9/2007 |
| CN | 101207742 A | 6/2008 |

OTHER PUBLICATIONS

Howlett, Jake, "Sensible Web Navigation," http://www.codestore.net/store.nsf/unid/EPSD-66GGUM, Nov. 8, 2004.

(Continued)

*Primary Examiner* — Phi Hoang
(74) *Attorney, Agent, or Firm* — Winstead, P.C.

(57) ABSTRACT

A method, computer program product and system for automatically determining an object display mode to provide a display for objects. Information about the objects to be displayed and information about a display area is received. An object display mode is selected according to the received information about the display area and according to the received information about the objects to be displayed. A display for the objects is then provided with the selected object display mode. Switching can be made between a single-page display mode and a paging display mode, and whether in the single-page display mode or in the paging display mode, the user can conveniently browse and select the display objects, and the browsing efficiency and user experience of object display for the user are improved.

16 Claims, 5 Drawing Sheets

(56) References Cited

OTHER PUBLICATIONS

Kurlow, Stephen, "A New Object-Oriented Technique for Building a Dynamic Graphical User Interface," Sep. 1995.

O'Conner, John, "Customize Your JList Display," http://java.sun.com/developer/technicalArticles/GUI/jlist/, Nov. 2005.

* cited by examiner

| FIRST SECTION | PREVIOUS SECTION | NEXT SECTION | LAST SECTION | GOTO |
|---|---|---|---|---|
| | NAME OF OBJECT | 12789cc8d75 | | 1 |
| | NAME OF OBJECT | 12789cc8d76 | | 2 |
| | NAME OF OBJECT | 12789cc8d77 | | 3 |
| | NAME OF OBJECT | 12789cc8d78 | | 4 |
| | NAME OF OBJECT | 12789cc8d79 | | 5 |
| | NAME OF OBJECT | 12789cc8d7a | | 6 |
| | NAME OF OBJECT | 12789cc8d7b | | 7 |
| | NAME OF OBJECT | 12789cc8d7c | | 8 |
| | NAME OF OBJECT | 12789cc8d7d | | 9 |
| | NAME OF OBJECT | 12789cc8d7e | | 10 |

FIG. 3A

| | | | |
|---|---|---|---|
| ⊞----◎ | NAME OF OBJECT | 1278a2f3b0e | 1 |
| ⊞----◎ | NAME OF OBJECT | 1278a2f3b0f | 2 |
| ⊞----◎ | NAME OF OBJECT | 1278a2f3b10 | 3 |
| ⊞----◎ | NAME OF OBJECT | 1278a2f3b11 | 4 |
| ⊞----◎ | NAME OF OBJECT | 1278a2f3b12 | 5 |
| ⊞----◎ | NAME OF OBJECT | 1278a2f3b13 | 6 |
| ⊞----◎ | NAME OF OBJECT | 1278a2f3b14 | 7 |
| ⊞----◎ | NAME OF OBJECT | 1278a2f3b15 | 8 |
| ⊞----◎ | NAME OF OBJECT | 1278a2f3b16 | 9 |
| ⊞----◎ | NAME OF OBJECT | 1278a2f3b17 | 10 |
| ⊞----◎ | NAME OF OBJECT | 1278a2f3b18 | 11 |
| ⊞----◎ | NAME OF OBJECT | 1278a2f3b19 | 12 |
| ⊞----◎ | NAME OF OBJECT | 1278a2f3b2a | 13 |
| ⊞----◎ | NAME OF OBJECT | 1278a2f3b2b | 14 |
| ⊞----◎ | NAME OF OBJECT | 1278a2f3b2c | 15 |

FIG. 3B

AUTOMATICALLY DETERMINING AN OBJECT DISPLAY MODE TO DISPLAY OBJECTS

CROSS-REFERENCE TO RELATED APPLICATIONS

This application claims priority under 35 U.S.C. §119(a) from Chinese Patent Application No. 201010218763.5, filed on Jun. 30, 2010, the contents of which are incorporated herein by reference.

TECHNICAL FIELD

The present invention relates to the field of object display technology, and more particularly, to a technology of automatically determining an object display mode to display objects.

BACKGROUND

In recent years, Graphical User Interface (GUI) technology has been rapidly developed and becoming widely used. A GUI is a computer operation user interface displayed graphically. As compared with the command line interface used previously by computers, the graphical interface is visually more acceptable for the user.

A system having a GUI generally exhibits a series of objects (or called display objects) to be browsing or selected by the user through a display window. In many cases, there are many objects to be displayed; however, the area (size) of the display area is limited thereby making it difficult to display all the objects in a single page (for example, displaying all information pertaining to the population of a city through a display screen), which brings a good many inconveniences to the user's browsing and selection. It is difficult for the user to find the targeted objects from among a great number of display objects, and it is difficult for the user to remember which objects have been browsed before. All these will seriously affect the user's experience and reduce the efficiency for displaying the objects.

There currently exists some technical solutions for displaying a great number of objects. According to one solution, a great number of objects to be displayed are displayed in a single page with the use of a scrollbar where the user drags the scrollbar to browse all the objects that otherwise cannot be displayed in one page. A significant disadvantage of this solution is that if there are so many objects to be displayed, the scrollbar will become very narrow and hard to be dragged with a mouse, and the accuracy of dragging is greatly reduced (a slight drag will slide over many objects), and it is difficult for the user to determine how many objects have been previously browsed. According to another solution, a plurality of objects are displayed in the manner of paging, while a dragging function of the scrollbar is provided for each page. A significant disadvantage for this solution is that the user cannot browse all the objects displayed in each page at a glance after clicking the page, and it is still necessary to drag the scrollbar in each page so as not to skip over every object, which adversely affects the user's experience and reduces the efficiency of browsing objects.

BRIEF SUMMARY

In one embodiment of the present invention, a method for providing a display for objects comprises receiving information about objects to be displayed and information about a display area. The method further comprises selecting an object display mode according to the received information about the display area and according to the received information about the objects to be displayed. Additionally, the method comprises providing, by a processor, the display for the objects with the selected object display mode.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 3A illustrates an example for providing a display for the objects by selecting a paging object display mode, according to an embodiment of the invention;

FIG. 3B illustrates an example for providing a display for the objects by selecting a single-page object display mode, according to an embodiment of the invention.

DETAILED DESCRIPTION

The present invention comprises a method, computer program product and system for automatically determining an object display mode to display objects as will be described in detail below by embodiments with reference to the accompanying drawings.

Figure 1:
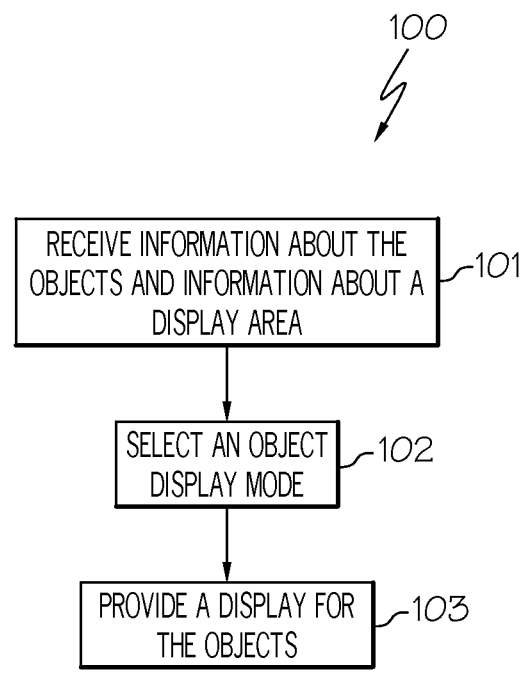
FIG. 1 is a flowchart of a method for providing a display for the objects according to an embodiment of the invention.

FIG. 1 is a flowchart of a method 100 for displaying objects according to an embodiment of the invention. Referring to FIG. 1, in step 101, information about the objects to be displayed is received. According to an embodiment of the invention, the information about the objects to be displayed comprises the quantity of the objects to be displayed. According to another embodiment of the invention, the information about the objects to be displayed comprises size information for each of the objects to be displayed. Here, the size information may be understood as information about dimensions exhibited by the object. Those skilled in the art will appreciate that, the information about the objects to be displayed, received at step 101 may result from a user's request to display objects. Information about the display area is also received at step 101. Here, the display area refers to a medium for displaying the objects, comprising any electronic (or optical) medium for displaying information, such as an electronic display screen, a liquid crystal display screen, a mobile (portable) telephone display screen, and the like. According to an embodiment of the invention, the information about the display area comprises size information of the display area, namely, an overall dimension information of the display area, which may be understood as dimension information for the display area effectively displaying the objects (length, width, height or dimension information represented by pixels).

In step 102, an object display mode is selected according to the received information about the display area and information about the objects to be displayed. According to an embodiment of the invention, the object display modes that can be selected comprise a single-page object display mode and a paging object display mode, and selecting an object display mode means selecting one of the above two display modes. Those skilled in the art will appreciate that, naming of the display modes does not mean any limitation to the display modes that can be selected. Specific meanings of the single-page object display mode and the paging object display mode will be described in connection with step 103. Furthermore, how to select an object display mode according to the received information for the display area and the received information about the objects to be displayed will be described in further detail in connection with FIG. 2.

In step 103, the display for the objects is provided with the selected object display mode. According to an embodiment of the invention, providing a display for the objects means visually presenting the objects to be displayed on a display medium. According to an embodiment of the invention, in response to selecting the paging object display mode, providing a display for the objects with the selected object display mode comprises: displaying the objects with a plurality of pages, where the quantity of objects displayed in each page is less than or equal to an accommodation value of the display area. According to another embodiment of the invention, in response to selecting the single-page object display mode, providing a display for the objects with the selected object display mode comprises: displaying all the objects to be displayed with one page. A specific meaning of and manners of acquiring the accommodation value of the display area will be described in detail below in combination with FIG. 2.

Figure 2:
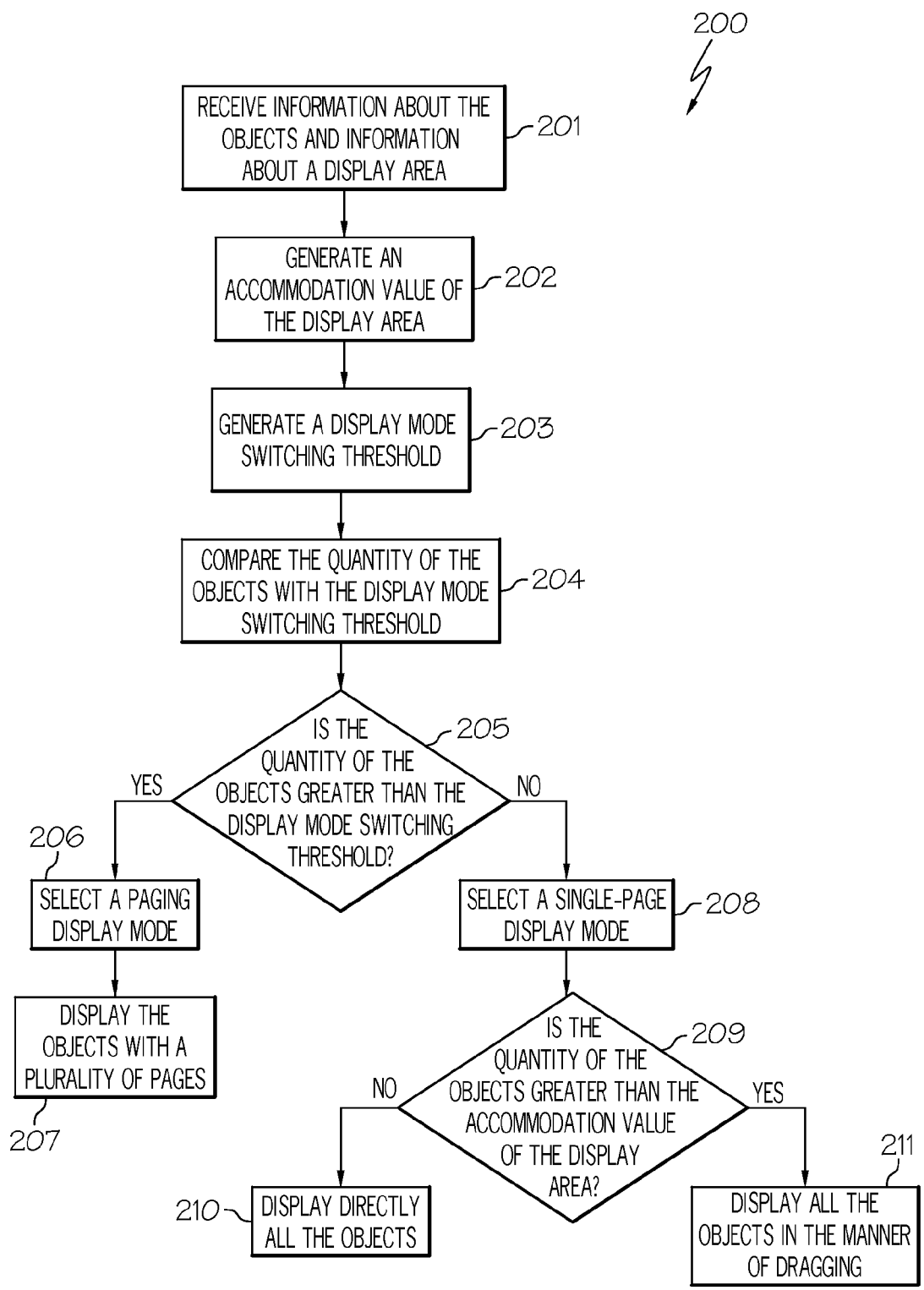
FIG. 2 is a flowchart of an alternative method for providing a display for the objects according to another embodiment of the invention.

FIG. 2 is a flowchart of a method 200 for providing a display for objects according to another embodiment of the present invention. Referring to FIG. 2, in step 201, information about the objects to be displayed and information about a display area are received.

Next at step 202, an accommodation value of the display area is generated according to the size information of the display area and the size information for each object to be displayed. The accommodation value of the display area indicates the quantity of objects that can be directly accommodated in the display area. According to an embodiment of the invention, a ratio of the size information of the display area to the size information for each object to be displayed can directly serve as the accommodation value of the display area. For example, assuming that a width of the display area is 100, and a width of each object to be displayed is 20, then the accommodation value of the display area is 100/20=5, that is to say, the quantity of objects that can be directly accommodated in the display area is 5. According to another embodiment of the invention, the ratio of the size of the display area to the size of each object to be displayed is rounded down to generate the accommodation value of the display area. For example, if a width of the display area is 100 and a width of each object to be displayed is 30, then the accommodation value of the display area is obtained by rounding down 100/30, namely, 3, that is to say, the quantity of objects that can be directly accommodated in the display area is 3. According to a further embodiment of the invention, the accommodation value of the display area is a value set by the user. For example, if a width of the display area is 100 and a width of each object to be displayed is 30, then the accommodation value of the display area may be set by the user as 2. According to a still further embodiment of the invention, the accommodation value of the display area is set as a value that is convenient for the user to make statistics of the quantity of the objects, such as 5, 10, or 20. For example, in the paging object display mode, the user can conveniently make statistics of how many objects have been browsed by multiplying the quantity of pages browsed by the accommodation value of the display area. Those skilled in the art will appreciate that, although the above uses "width" as a criterion for measuring the size of the display area and the size of the object, this merely is described by way of an illustration, and any parameter such as "length," "pixel" or a combination thereof (for example, not only considering the width of each object to be displayed and the width of the display area, but also considering the length of the object to be displayed and the length of the display area) can be used as the criterion for measuring.

Next, at step 203, a display mode switching threshold is generated according to the accommodation value of the display area. The display mode switching threshold refers to a threshold based on which a different display mode is selected. Although the accommodation value of the display area has been generated in step 202, this does not mean that the display mode is switched over (selecting the paging object display mode) once the quantity of the objects to be displayed reaches or exceeds the accommodation value of the display area, and whether or not it is necessary to switch over the display mode is judged in accordance with the display mode switching threshold rather than the accommodation value of the display area. According to an embodiment of the invention, the display mode switching threshold is greater than the accommodation value of the display area. According to another embodiment of the invention, the display mode switching threshold is equal to the accommodation value of the display area. According to an embodiment of the invention, after the accommodation value of the display area is generated, the display mode switching threshold is generated by using a preset multiplier. For example, if the preset multiplier is 1.2, assuming that a width of the display area is 100, and a width of each object to be displayed is 20, then the accommodation value of the display area is 100/20=5, and the display mode switching threshold is 5×1.2=6. That is, only when the quantity of the objects to be displayed exceeds 6, the paging object display mode is selected; if the quantity of the objects to be displayed is equal to or less than 6, then the single-page object display mode is selected. According to another embodiment of the invention, the display mode switching threshold is a value set by the user according to the generated accommodation value of the display area. Those skilled in the art will appreciate that, similar to the generation of the accommodation value of the display area, the display mode switching threshold can be generated in various manners, and regardless of which manner the display mode switching threshold is computed or set, it falls within the scope of the invention.

At step 204, the quantity of the objects to be displayed is compared with the display mode switching threshold. A determination is made in step 205 as to whether the quantity of the objects to be displayed is greater than the display mode switching threshold. If the quantity of the objects to be displayed is greater than the display mode switching threshold, then, in step 206, the paging display mode is selected and the flow advances to step 207 where the objects are displayed with a plurality of pages, where the quantity of objects displayed in each page is less than or equal to the accommodation value of the display area. For example, if the preset multiplier is 1.2, assuming that a width of the display area is 100, and a width of each object to be displayed is 20, then the accommodation value of the display area is 100/20=5, and the display mode switching threshold is 5×1.2=6; if there are 8 objects to be displayed, then the paging object display mode is selected, and the 8 objects are displayed with two pages, where 5 objects are displayed in the first page and 3 objects are displayed in the second page. It can be seen that, the quantity of the objects displayed in each page is less than or equal to the accommodation value of the display area 5. It should be emphasized that, why in the paging display mode, the quantity of the objects displayed in each page is determined according to the accommodation value of the display area rather than the display mode switching threshold is in that, if the display of objects more than the accommodation value for the display area is still provided in each page in the case of the paging display mode, the dragging (sliding) function or the like is used, thereby affecting the displaying and browsing efficiency and lowering user experience.

Returning to step 205, if the quantity of the objects to be displayed is less than or equal to the display mode switching threshold, then the single-page display mode is selected at step 208, and the flow advances to a step 209 where it is determined whether the quantity of the objects is greater than the accommodation value of the display area. If the quantity of the objects is not greater than the accommodation value of the display area, then, in step 210, all the objects are directly displayed in the display area. If, however, the quantity of the objects is greater than the accommodation value of the display area, then, in step 211, all the objects are displayed in the display area in the manner of dragging.

For example, if the preset multiplier is 1.2, assuming that a width of the display area is 100, and a width of each object to be displayed is 20, then the accommodation value of the display area is 100/20=5, and the display mode switching threshold is 5×1.2=6; if there are 6 objects to be displayed, then the single-page object display mode is selected. It is further judged whether or not the quantity of the objects to be displayed is greater than the accommodation value of the display area 5, so at step 211, all the 6 objects are displayed in the display area in the manner of dragging. Why all the 6 objects are displayed in a page in the manner of dragging is because the accommodation value of the display area is 5, and 6 objects cannot be directly displayed in the display area, so a dragging function is provided for assistance. It should be noted that, why the 6 objects are not displayed with two pages is because, if 5 objects are displayed in the first page and only 1 object is displayed in the second page, the user clicks a button like "next page" to browse the remaining 1 object, thus the user cannot conveniently browse all the objects and switches between two pages. According to an embodiment of the invention, the dragging function means adding in the display area a scrollbar (or sliding bar) draggable by the user. According to another embodiment of the invention, the dragging function means adding a drop-down (drop-up) arrow clickable by the user. It should be noted that, the dragging function can be performed by other manners, for example, any manner for controlling switching between visible portions and concealed portions of the objects displayed in the display area, comprising wired control, wireless control, speech control and the like.

It can be seen from the explanations for the methods illustrated in FIGS. 1 and 2 that, with the methods for providing a display for objects, the accommodation value of the display area and the display mode switching threshold can be utilized for selecting a display mode and controlling the quantity of objects displayed in each page; the dragging function is not used in the case of paging display, whereas in the single-page display mode, whether or not paging is used is determined not stiffly according to the accommodation value of the display area, but the object display mode is selected with the tradeoff by sufficiently taking user experience and the displaying and browsing efficiency into consideration. With the method, computer program product and system of the present invention, one can flexibly use two thresholds to select an object display mode (single-page object display mode or paging object display mode) for displaying a plurality of objects such that all the objects are displayed in one page (allowing the use of the dragging function) or with a plurality of pages (not using the dragging function). Thereby, it can guarantee a display window having good experience for the users, prevent the displaying and browsing process of the plurality of objects from being too slow, avoid inconvenience of the dragging function in the case of a plurality of objects, and provide a function for setting a specific display effect for each display mode according to user preferences.

FIGS. 3A and 3B are specific examples for providing a display for objects according to the embodiments of the invention, where FIG. 3A illustrates an example of a display result in a paging object display mode and FIG. 3B illustrates an example of a display result in a single-page object display mode.

Specifically, the examples illustrated in FIGS. 3A and 3B are based on the following assumptions: the accommodation value of the display area is 10, and the display mode switching threshold is 20. If the quantity of the objects to be displayed is 50, the example of the object display is illustrated in FIG. 3A. Since 50 is greater than 20, the paging object display mode is selected and the 50 objects are displayed with a plurality of pages, where the quantity of objects displayed in each page is less than or equal to the accommodation value of the display area. As illustrated in FIG. 3A, "First Section" indicates the first page, "Previous Section" indicates a previous page, "Next Section" indicates a next page, "Last Section" indicates a last page, "Goto" indicates a page to go to, and the quantity of objects displayed in each page is merely equal to the accommodation value of the display area, 10 in this case.

If the quantity of the objects to be displayed is 15, the example of object display is illustrated in FIG. 3B. Since 15 is less than 20, the single-page object display mode is selected, and all 15 objects are displayed with one page. It is further judged that 15 is greater than 10, so the 15 objects are displayed in a page in the manner of dragging. It can be seen that, the dragging function in FIG. 3B is implemented by a scrollbar on the right side.

Figure 4:
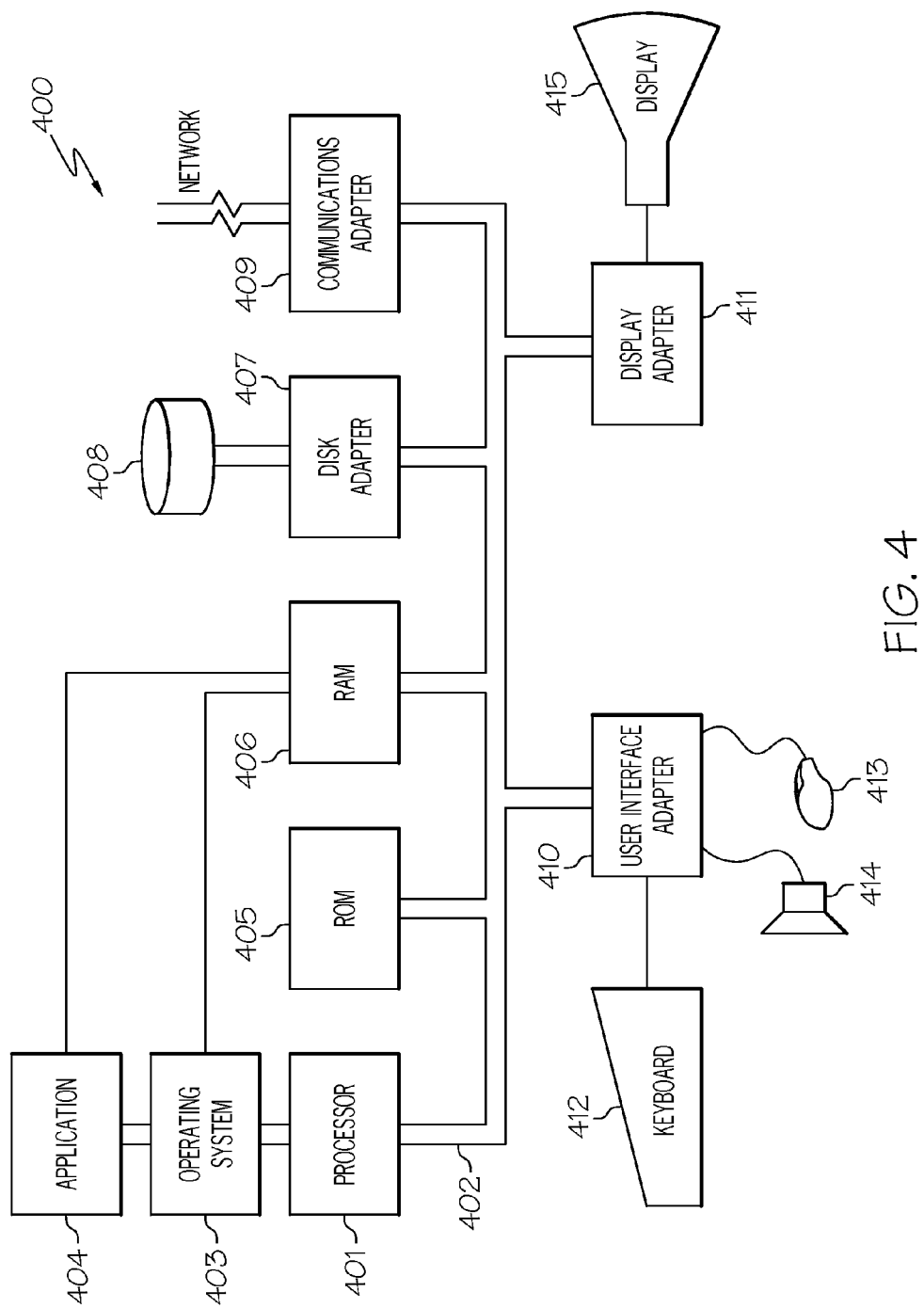
FIG. 4 depicts an embodiment of a hardware configuration of a computer system which is representative of a hardware environment for practicing the present invention.

FIG. 4 depicts an embodiment of a hardware configuration of a computer system 400 which is representative of a hardware environment for practicing the present invention. Referring to FIG. 4, computer system 400 has a processor 401 coupled to various other components by system bus 402. An operating system 403 may run on processor 401 and provide control and coordinate the functions of the various components of FIG. 4. An application 404 in accordance with the principles of the present invention may run in conjunction with operating system 403 and provide calls to operating system 403 where the calls implement the various functions or services to be performed by application 404. Application 404 may include, for example, an application for providing a display for objects as discussed above.

Referring again to FIG. 4, read-only memory ("ROM") 405 may be coupled to system bus 402 and include a basic input/output system ("BIOS") that controls certain basic functions of computer device 400. Random access memory ("RAM") 406 and disk adapter 407 may also be coupled to system bus 402. It should be noted that software components including operating system 403 and application 404 may be loaded into RAM 406, which may be computer system's 400 main memory for execution. Disk adapter 407 may be an integrated drive electronics ("IDE") adapter that communicates with a disk unit 408, e.g., disk drive.

Computer system 400 may further include a communications adapter 409 coupled to bus 402. Communications adapter 409 may interconnect bus 402 with an outside network (not shown) thereby allowing computer system 400 to communicate with other similar devices.

I/O devices may also be connected to computer system 400 via a user interface adapter 410 and a display adapter 411. Keyboard 412, mouse 413 and speaker 414 may all be interconnected to bus 402 through user interface adapter 410. Data may be inputted to computer system 400 through any of these devices. A display monitor 415 may be connected to system bus 402 by display adapter 411. In this manner, a user is capable of inputting to computer system 400 through keyboard 412 or mouse 413 and receiving output from computer system 400 via display 415 or speaker 414.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the exemplary embodiments of the present invention have been illustrated and described above, the present invention is not limited to such embodiments. Those skilled in the art could make various variations, replacements and modifications under the teaching of the specification without departing from the scope and spirit of the present invention. It should be appreciated that, all these variations, replacements and modifications still fall within the scope of the present invention. The scope of the present invention is only defined by the attached claims.

The invention claimed is:

1. A method for providing a display for objects, the method comprising:
   receiving a quantity of objects to be displayed, a size information about the objects to be displayed and a size information about a display area;
   generating an accommodation value of the display area indicating a quantity of objects that can be directly accommodated in the display area, wherein the accommodation value of the display area is based on a ratio of the size information of the display area to the size information for each object to be displayed, wherein the size information of the display area and the size information for each object corresponds to a parameter comprising one of the following: a width, a length, a pixel and a combination of the foregoing;

generating a display mode switching threshold according to the accommodation value of the display area, wherein the display mode switching threshold is a threshold based on which a different display mode is selected, wherein the display mode switching threshold is a preset multiplier of the accommodation value of the display area;

selecting an object display mode by comparing the quantity of the objects to be displayed with the display mode switching threshold; and providing, by a processor, the display for the objects with the selected object display mode.

2. The method according to claim 1, wherein the object display mode comprises a paging object display mode and a single-page object display mode.

3. The method according to claim 1, wherein said selecting the object display mode by comparing the quantity of the objects to be displayed with the display mode switching threshold comprises:

in response that the quantity of the objects to be displayed is greater than the display mode switching threshold, selecting a paging object display mode; and in response that the quantity of the objects to be displayed is less than or equal to the display mode switching threshold, selecting a single-page object display mode.

4. The method according to claim 3, wherein in response that the paging object display mode is selected, providing the display for the objects with the selected object display mode comprises:

displaying the objects with a plurality of pages, wherein the quantity of the objects displayed in each page is less than or equal to the accommodation value of the display area.

5. The method according to claim 3, wherein in response that the single-page object display mode is selected, providing the display for the objects with the selected object display mode comprises:

displaying all the objects to be displayed with one page.

6. The method according to claim 5, wherein said displaying all the objects to be displayed with one page comprises:

in response that the quantity of all the objects to be displayed is less than or equal to the accommodation value of the display area, directly displaying all the objects in the display area; and in response that the quantity of all the objects to be displayed is greater than the accommodation value of the display area, displaying all the objects in the display area in a manner of dragging.

7. A computer program product embodied in a computer readable storage device for providing a display for objects, the computer program product comprising the programming instructions for:

receiving a quantity of objects to be displayed, a size information about the objects to be displayed and a size information about a display area;

generating an accommodation value of the display area indicating a quantity of objects that can be directly accommodated in the display area, wherein the accommodation value of the display area is based on a ratio of the size information of the display area to the size information for each object to be displayed, wherein the size information of the display area and the size information for each object corresponds to a parameter comprising one of the following: a width, a length, a pixel and a combination of the foregoing;

generating a display mode switching threshold according to the accommodation value of the display area, wherein the display mode switching threshold is a threshold based on which a different display mode is selected, wherein the display mode switching threshold is a preset multiplier of the accommodation value of the display area;

selecting an object display mode by comparing the quantity of the objects to be displayed with the display mode switching threshold; and providing the display for the objects with the selected object display mode.

8. The computer program product according to claim 7, wherein the object display mode comprises a paging object display mode and a single-page object display mode.

9. The computer program product according to claim 7, wherein the programming instructions for selecting the object display mode by comparing the quantity of the objects to be displayed with the display mode switching threshold comprises the programming instructions for:

in response that the quantity of the objects to be displayed is greater than the display mode switching threshold, selecting a paging object display mode; and in response that the quantity of the objects to be displayed is less than or equal to the display mode switching threshold, selecting a single-page object display mode.

10. The computer program product according to claim 9, wherein in response that the paging object display mode is selected, the programming instructions for providing the display for the objects with the selected object display mode comprises the programming instructions for:

displaying the objects with a plurality of pages, wherein the quantity of the objects displayed in each page is less than or equal to the accommodation value of the display area.

11. The computer program product according to claim 9, wherein in response that the single-page object display mode is selected, the programming instructions for providing the display for the objects with the selected object display mode comprises the programming instructions for:

displaying all the objects to be displayed with one page.

12. A system, comprising: a memory unit for storing a computer program for providing a display for objects;

and a processor coupled to said memory unit, wherein said processor, responsive to said computer program, comprises circuitry for receiving a quantity of objects to be displayed, a size information about the objects to be displayed and a size information about a display area;

circuitry for generating an accommodation value of the display area indicating a quantity of objects that can be directly accommodated in the display area, wherein the accommodation value of the display area is based on a ratio of the size information of the display area to the size information for each object to be displayed, wherein the size information of the display area and the size information for each object corresponds to a parameter comprising one of the following: a width, a length, a pixel and a combination of the foregoing;

circuitry for generating a display mode switching threshold according to the accommodation value of the display area, wherein the display mode switching threshold is a threshold based on which a different display mode is selected, wherein the display mode switching threshold is a preset multiplier of the accommodation value of the display area;

circuitry for selecting an object display mode by comparing the quantity of the objects to be displayed with the display mode switching threshold; and circuitry for providing the display for the objects with the selected object display mode.

13. The system according to claim 12, wherein the object display mode comprises a paging object display mode and a single-page object display mode.

14. The system according to claim 12, wherein the circuitry for selecting the object display mode by comparing the quantity of the objects to be displayed with the display mode switching threshold comprises:

in response that the quantity of the objects to be displayed is greater than the display mode switching threshold, circuitry for selecting a paging object display mode; and in response that the quantity of the objects to be displayed is less than or equal to the display mode switching threshold, circuitry for selecting a single-page object display mode.

15. The system according to claim 14, wherein in response that the paging object display mode is selected, the circuitry for providing the display for the objects with the selected object display mode comprises:

circuitry for displaying the objects with a plurality of pages, wherein the quantity of the objects displayed in each page is less than or equal to the accommodation value of the display area.

16. The system according to claim 14, wherein in response that the single-page object display mode is selected, the circuitry for providing the display for the objects with the selected object display mode comprises:

circuitry for displaying all the objects to be displayed with one page.

* * * * *